Aug. 31, 1926.
W. H. SCHOONMAKER
1,598,106
AUTOMOBILE HEADLIGHT
Filed Jan. 17, 1923
2 Sheets-Sheet 1
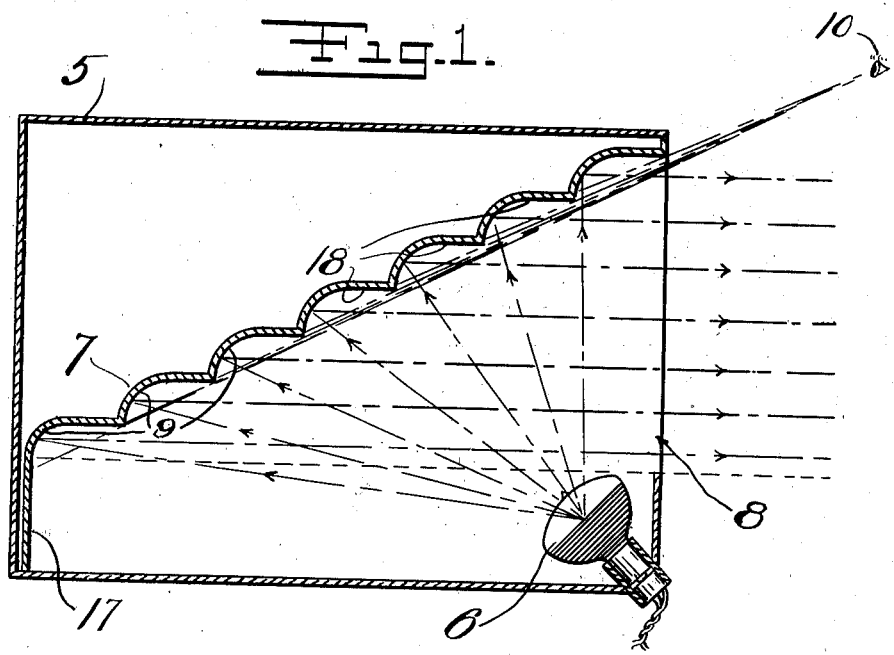
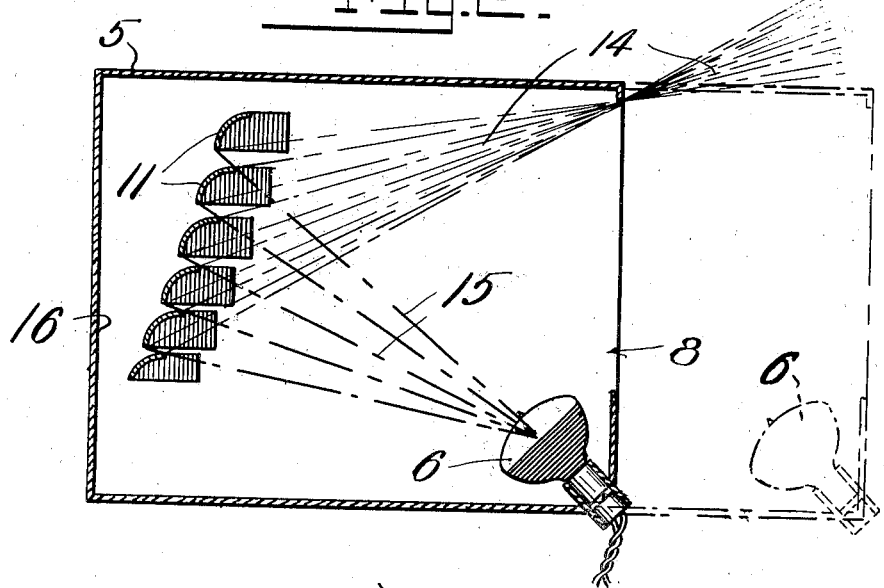
Inventor
William H. Schoonmaker
By his Attorney Aug. 31, 1926.
W. H. SCHOONMAKER
1,598,106
AUTOMOBILE HEADLIGHT
Filed Jan. 17, 1923    2 Sheets-Sheet 2
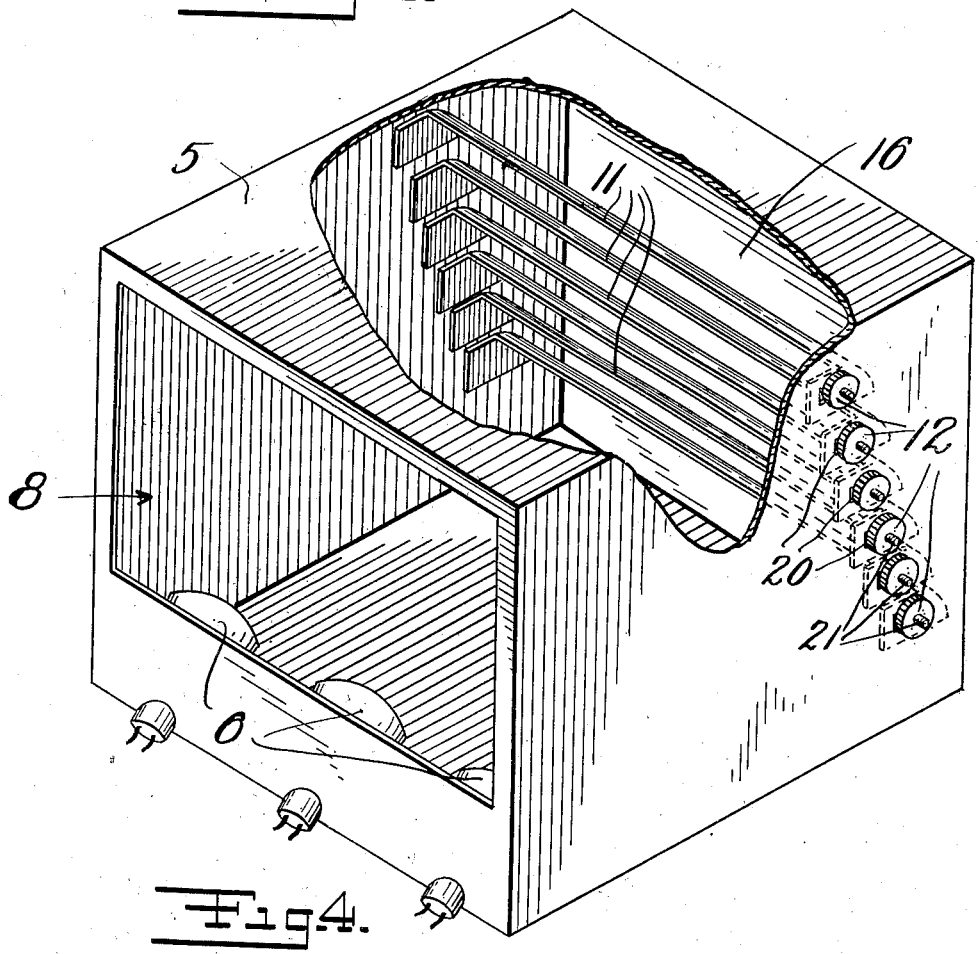
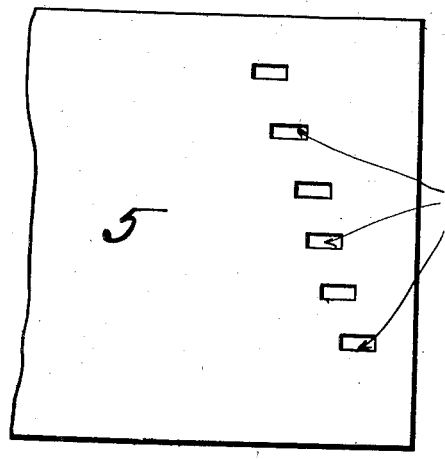
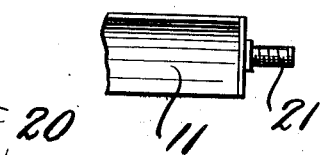
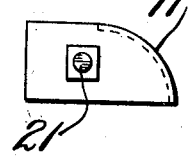

Patented Aug. 31, 1926.

1,598,106

UNITED STATES PATENT OFFICE.

WILLIAM H. SCHOONMAKER, OF MONTCLAIR, NEW JERSEY.

AUTOMOBILE HEADLIGHT.

Application filed January 17, 1923. Serial No. 613,151.

This invention relates generally to light projecting devices and particularly to devices of this general nature, such as automobile headlights, wherein it is necessary to guard against the undesired projection of light rays outside the path of the illuminating beam.

It is well known that the ordinary automobile headlight unless fitted with a refracting or dimming device is open to the objection that a person facing the light is likely to be blinded by the intensely bright light rays projected from the lamp or from the polished surface of the reflector with which the headlight is equipped. A general object of the present invention is to provide a light projecting device which will be free from the objections referred to and which will not dazzle or bewilder an observer unless his eyes are at an abnormal level directly in the path of the projected beam.

The invention includes the use of a reflector made up of curved sections so related to a source or sources of illumination common to all the reflector sections that a beam of light rays substantially parallel in vertical planes is produced. At the same time the relation of the reflector sections to each other is such as to present spaced apart reflecting surfaces so restricted in area or interspersed with black spaces as to offer a negligible projection of light rays into an observer's eyes positioned outside of but adjacent the illuminating beam.

In the drawings, in which two forms of the invention are illustrated,

Figure 1 is a view in vertical section and partly diagrammatic of a light projecting device embodying the invention.

Figure 2 is a view similar to Figure 1 of a modified form of the invention.

Figure 3 is an isometric view of the device shown in Figure 2 on a larger scale and partly broken away to show the reflecting elements.

Figures 4, 5 and 6 are views of details of mounting and adjusting means for the reflector elements shown in Figure 3.

Referring to the drawings for a more detailed description of the invention, at 5 is shown a lamp box or casing of any desired formation, and which is supplied with one or more lamps 6, a reflecting device 7, and a projecting outlet 8 which may be covered with glass or other transparent material.

The invention described herein resides chiefly in the construction of the reflecting device 7. The reflector will be seen in Figure 1 to consist of a unitary member having a plurality of reflecting sections 9. The reflecting sections may be and preferably are so formed with relation to the lamps 6 as to reflect light rays from the lamp through the opening 8 in parallel or substantially parallel relation to each other in vertical planes so as to obtain a desirable intensity of illumination at a considerable distance from the source. The reflecting surfaces extend in straight lines from one side to the other of the lamp box and therefore do not produce a parallel arrangement of the reflected rays in horizontal planes with the result that the beam spreads out fanwise with reference to the horizontal and thereby produces a desirable illuminating effect.

An important feature of the invention resides in the provision of the plurality of reflecting surfaces and their relation to each other, the effect of which is to render all but an insignificant strip along the lower edge of each reflecting surface invisible to the eyes of an observer in front of the projector with his eyes in a normal location outside the path of light rays making up the illuminating beam. The combined width of the visible portions of the reflecting surfaces is relatively small so that the number of stray light rays that are free to reach the eyes of the observer is very small. The result of this is that an observer whose eyes are in the position indicated at 10 in Figure 1 of the drawing would not experience the dazzling or blinding effect produced by ordinary lamp reflectors under similar circumstances.

In Figures 2 and 3 of the drawings the reflecting device is shown as made up of structurally distinct reflecting elements 11 which extend across the lamp box and to the sides of which the elements are adjustably attached as at 12 in Figure 3. The reflecting elements are spaced from each other and occupy a stepped formation or arrangement extending from a position near the upper wall of the lamp box to a position near the bottom of the box and to the rear. As in the arrangement illustrated in Figure 1, the individual reflecting surfaces are so related to the lamps 6 that rays from the lamps are reflected through the lamp box opening 8 in parallel relation in vertical planes. For this purpose the reflector members may each take, in vertical section, the formation of a parabolic curve with the lamps located substantially at the focal points of the curves as will be clear.

It will be seen that the reflector elements 11 are spaced apart so that an observer whose eyes are above the projected beam will see alternate bright sections and dark spaces with the result that rays reflected at an angle to the path of projection of the illuminating beam are so diminished in intensity by the interspersed dark patches as not to have a dazzling or blinding effect.

Another characteristic of the relation of the reflecting elements to each other consists in an overlapping of adjacent extreme edges of adjacent elements in lines extending through the sources of light to prevent the projection of light rays between the reflectors. In this way all the light rays received between the uppermost and lowermost reflectors are reflected to form part of the illuminating beam so that a desirably efficient degree of operation is produced.

The lines of vision which define the spaces or breaks in the reflecting area from the viewpoint of an observer are indicated at 14 in Figure 2 of the drawing while the lines 15 indicate that light rays clearing the edge of one reflector will engage and be reflected by the next adjacent reflector so that all the available rays are reflected and utilized. Preferably the inner rear wall 16 of the lamp box shown in Figures 2 and 3 is blackened as is the surface 17 of the reflector shown in Figure 1 to further lessen the apparent brightness and glare of the reflecting surfaces viewed from points outside the path of the beam. The horizontal lower surfaces 18 of the reflector shown in Figure 1 are of a neutral or non-reflecting nature.

It will be seen that the adjustment of the reflecting elements 11 provided by the pin and slot mounting shown in Figure 3 provides for the angular and bodily positioning of the reflecting elements to produce the relation to the lamps that is necessary to achieve the most desirable lighting effect.

In Figures 4, 5 and 6 of the drawing is shown the stepped relation of the slots 20 in which the screw ends 21 of the reflecting elements are held and retained by use of suitable nut members to provide the means of adjustment indicated generally at 12 in Figure 3 of the drawing.

It will be seen that I have provided a reflector construction for automobile headlights which is characterized by the absence of the glare or dazzle which is the source of frequent accidents with the use of headlight reflectors of the types heretofore used. The maintaining of an illuminating beam beneath the level of the eyes of pedestrians and the greatly restricted brightness of the reflecting surfaces visible to the eyes of such persons greatly diminishes the likelihood of accidents. This effect can be still further increased by the lengthening of the lamp box as indicated in dotted lines in Figure 2 of the drawings.

What I claim is:—

1. In a light projecting device, a source of light, and a reflecting device made up of a plurality of individually curved reflecting sections so arranged with relation to each other as to provide a continuous reflecting surface to the source of light and a broken surface from other viewpoints.

2. In a light projecting device, a source of light, and a reflecting device made up of a plurality of individually curved reflecting sections having a stepped relation to present a continuous reflecting surface to the source of light and a broken surface in the general direction of projection of the light rays reflected from the sections.

3. In a light projecting device, a lamp box, a light emitting opening at one end of the box, a reflecting device at the end of the box remote from the light emitting opening, and a lamp in the box mounted to direct its rays rearwardly against the reflecting device, said reflecting device being made up of separate individually curved reflecting sections extending in a straight line series in a stepped relation and adjustably mounted in the side walls of the box, and said sections being formed to receive light from said lamp and direct the light forwardly through the opening.

In testimony whereof I affix my signature.

WILLIAM H. SCHOONMAKER.